(Model.)

8 Sheets—Sheet 1.

L. MILLER.
HARVESTER BINDER.

No. 271,253. Patented Jan. 30, 1883.

Attest,
W. H. H. Knight,
W. Blackstock.

Inventor:
Lewis Miller,
By Hill & Church
His Attys.

(Model.) 8 Sheets—Sheet 2.

L. MILLER.
HARVESTER BINDER.

No. 271,253. Patented Jan. 30, 1883.

Attest,
W. H. H. Knight
W. Blackstock

Inventor,
Lewis Miller,
By Hill & Church
His Attys.

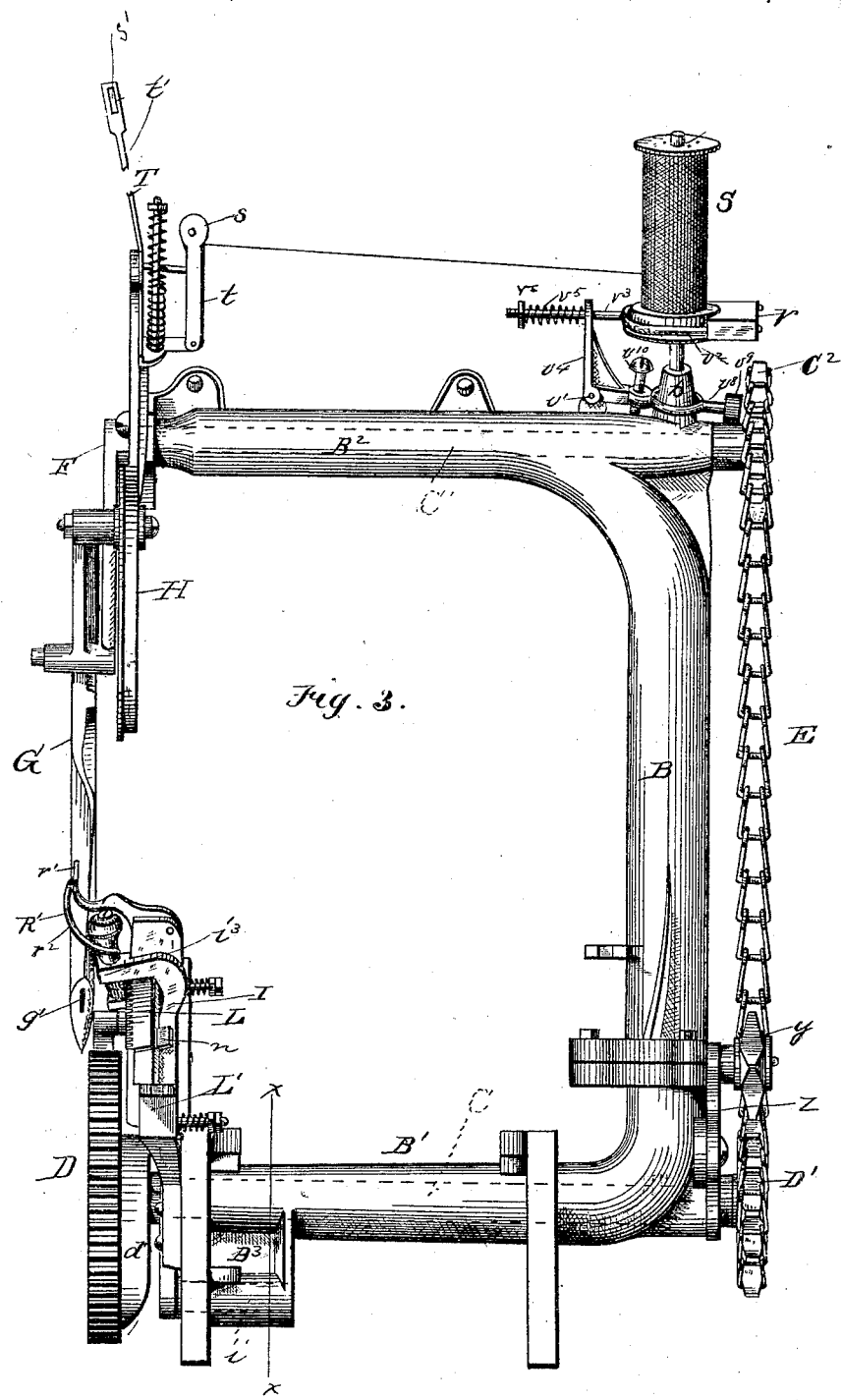

(Model.) 8 Sheets—Sheet 4.
L. MILLER.
HARVESTER BINDER.
No. 271,253. Patented Jan. 30, 1883.
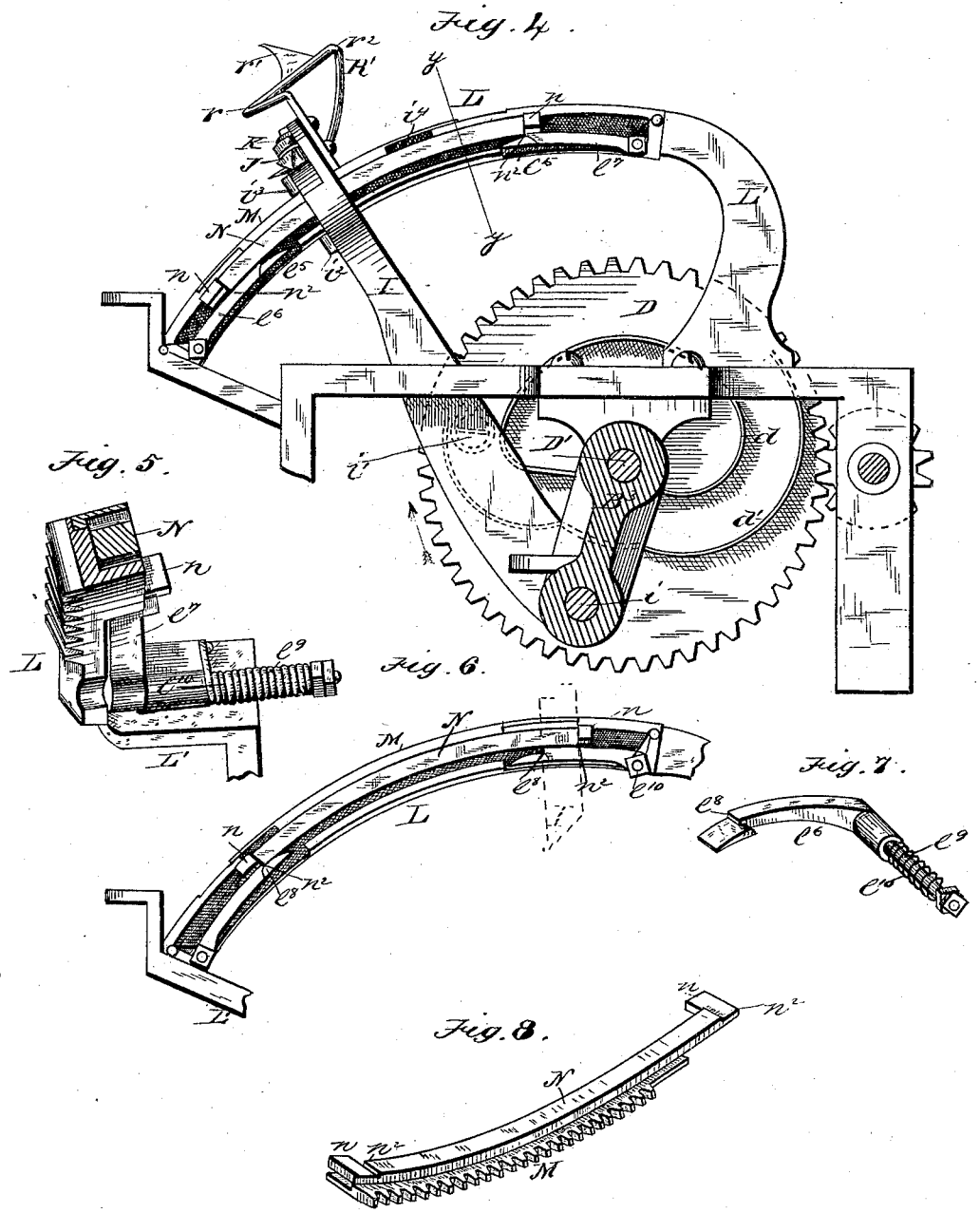
Attest,
W. H. H. Knight
W. Blackstock
Inventor,
Lewis Miller
M. Hill & Church
His Attys.

(Model.) 8 Sheets—Sheet 5.
L. MILLER.
HARVESTER BINDER.
No. 271,253. Patented Jan. 30, 1883.
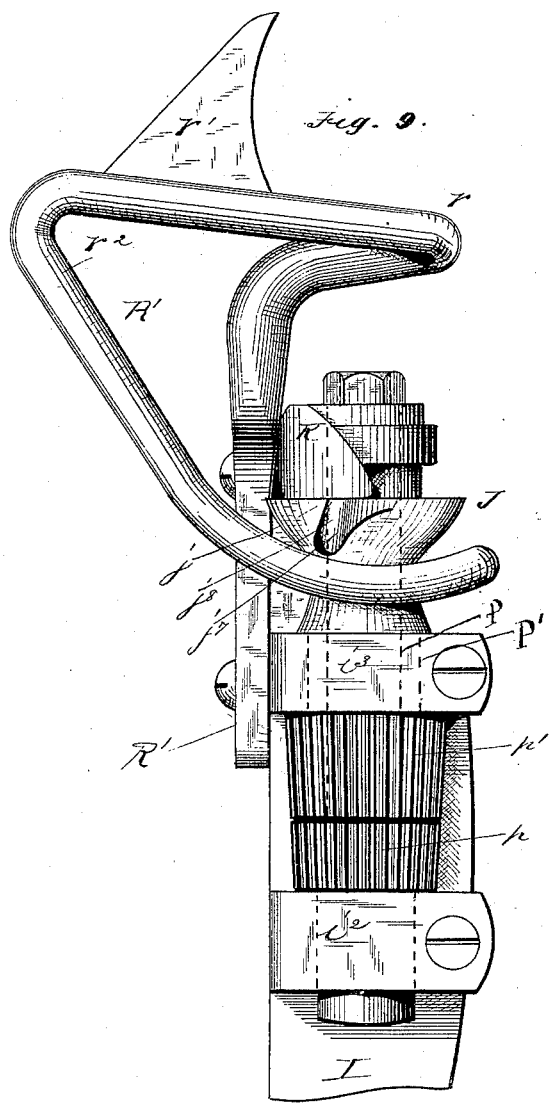
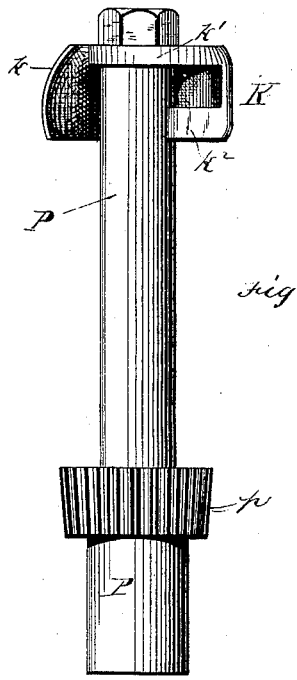
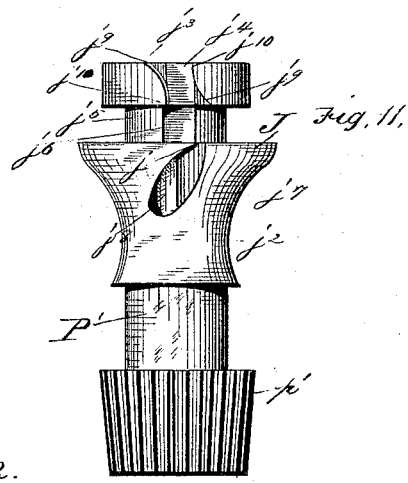
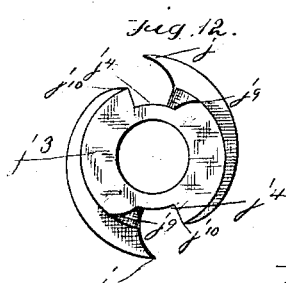
Attest.
W. H. H. Knight.
W. Blackstock.
Inventor,
Lewis Miller
By Hill & Church
His Attys (Model.)
L. MILLER.
HARVESTER BINDER.
No. 271,253. Patented Jan. 30, 1883.
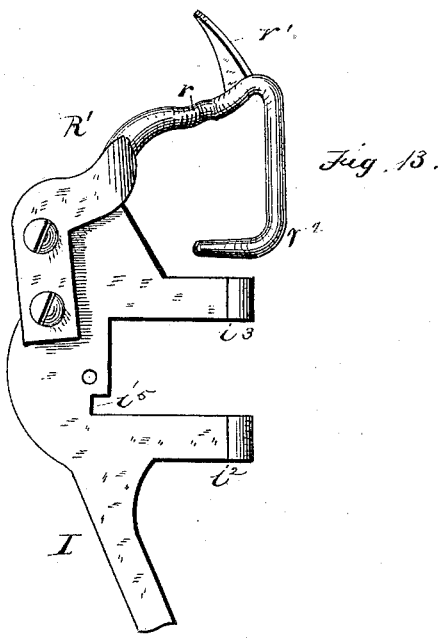
Fig. 13.
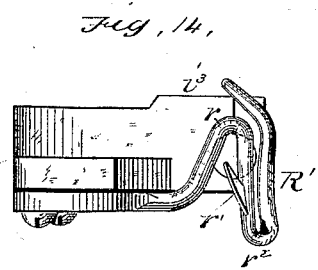
Fig. 14.
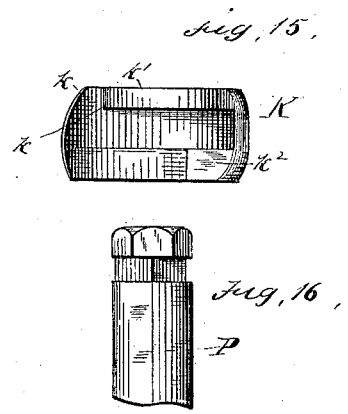
Fig. 15.
Fig. 16.
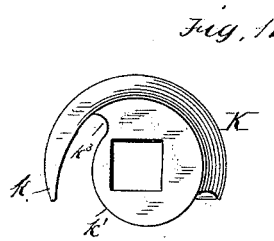
Fig. 17.
Attest,
W. H. H. Knight,
W. Blackstock.
Inventor,
Lewis Miller,
M Hill Church,
his attys (Model.)

8 Sheets—Sheet 7.

L. MILLER.
HARVESTER BINDER.

No. 271,253. Patented Jan. 30, 1883.

Attest,
W. H. H. Knight
W. Blackstock

Inventor,
Lewis Miller,
By Hill & Church,
His attys.

(Model.)

L. MILLER.
HARVESTER BINDER.

No. 271,253. Patented Jan. 30, 1883.

Attest,
W. H. H. Knight
W. Blackstock

Inventor,
Lewis Miller
By Hill & Church
His attys.

UNITED STATES PATENT OFFICE.

LEWIS MILLER, OF AKRON, OHIO.

HARVESTER-BINDER.

SPECIFICATION forming part of Letters Patent No. 271,253, dated January 30, 1883.

Application filed April 2, 1880. (Model.)

*To all whom it may concern:*

Be it known that I, LEWIS MILLER, of Akron, in the county of Summit and State of Ohio, have invented certain new and useful Improvements in Harvester-Binders; and I do hereby declare the following to be a full, clear, and exact description of the same, reference being had to the accompanying drawings, forming part of this specification, in which—

Figure 1:
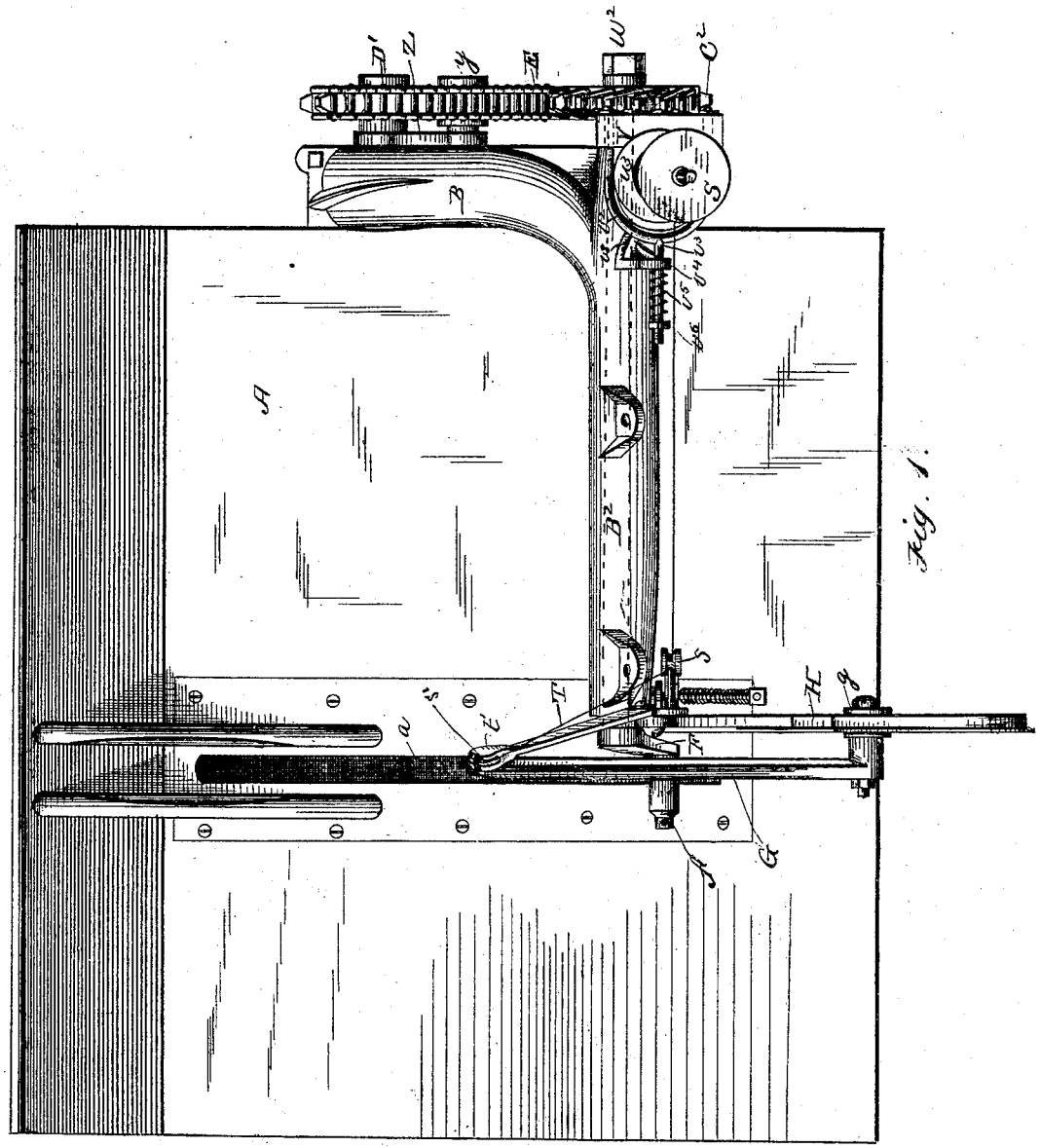
Figure 2:
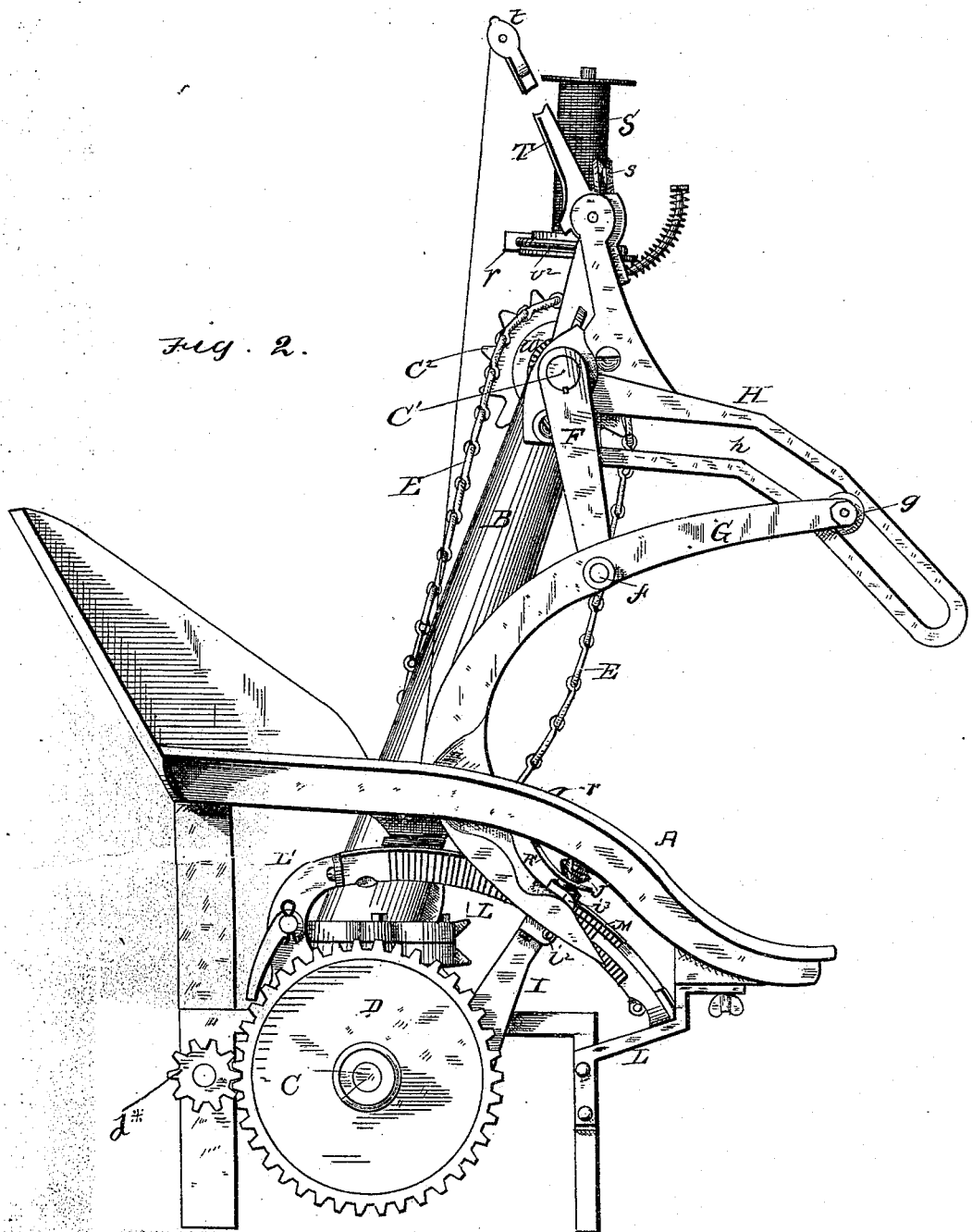
Figure 18:
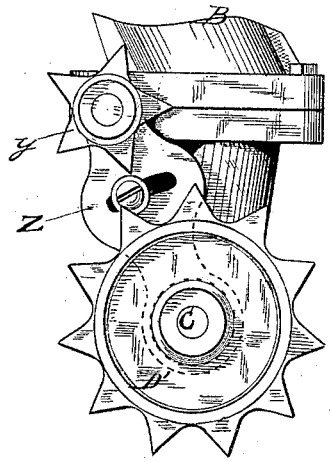
Figure 19:
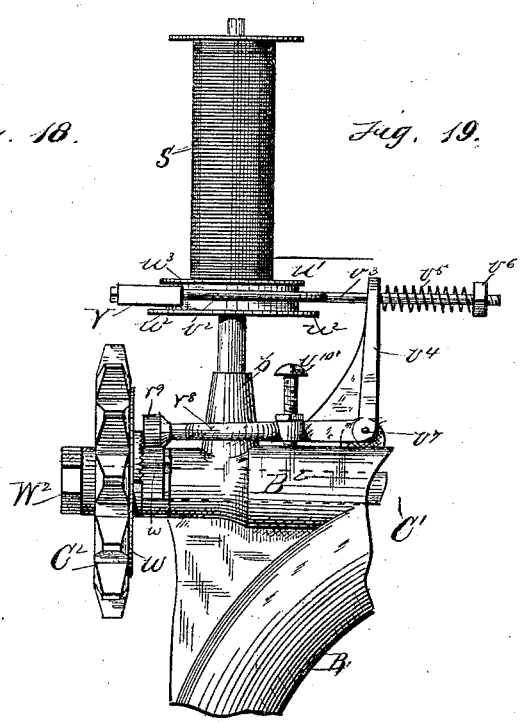
Figure 20:
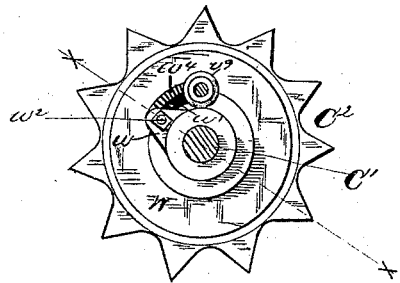
Figure 21:
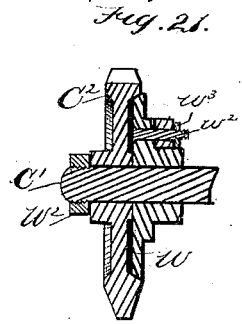
Figure 22:
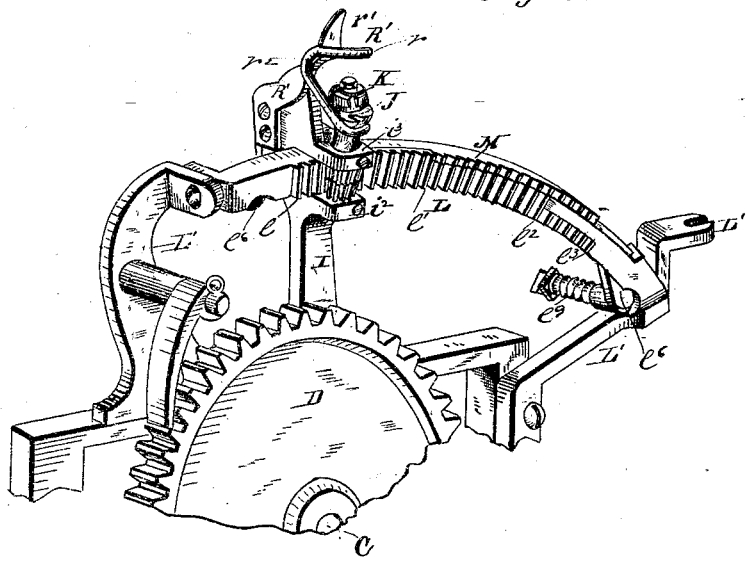
Figure 23:
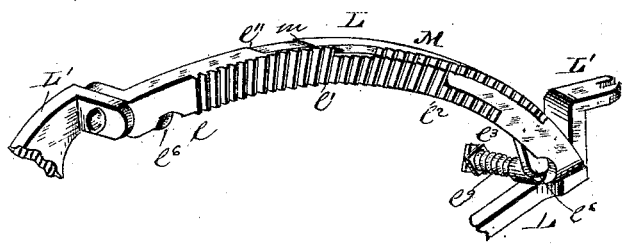

Figure 1 represents a top plan view of the binder; Fig. 2, an end elevation; Fig. 3, a front view of the binding mechanism disconnected from the binding-platform. Fig. 4 is a sectional elevation taken on the line $x\, x$, Fig. 3. Fig. 5 represents a cross-sectional view of the segmental rack-bars, taken on the line $y\, y$, Fig. 4; Fig. 6, a view of the back side of the stationary segmental rack-bar and connected parts; Fig. 7, a perspective view of one of the pawls; Fig. 8, a similar view of the sliding rack-bar inverted; Fig. 9, an enlarged view of the combined twisting and cutting heads; Fig. 10, a view of the cutting-head attached to its shaft; Fig. 11, a view of the twisting-head and its shaft; Fig. 12, a top plan view of the twisting-head; Fig. 13, a view of the upper part of the vibratory arm and the curved and pronged arm R; Fig. 14, a top plan view of the parts represented in Fig. 13; Figs. 15 and 16, elevations of the cutting-head and a portion of its shaft, respectively; Fig. 17, a top plan of the cutting-head; Fig. 18, a view of the lower sprocket-wheel and chain-tightening device; Fig. 19, a view of the variable tension apparatus; Figs. 20 and 21, views showing the manner of adjusting the cam $w$; Fig. 22, a perspective view, showing the position of the rack-bars when the twisting-head is in position to receive the wire; and Fig. 23, a similar view, showing the position of the rack-bars after the twisting has been accomplished and the wire cut.

Similar letters of reference in the several figures denote the same parts.

This invention relates to improvements in automatic grain-binders for harvesters; and it consists in certain novelties of construction, which will be hereinafter described, and pointed out particularly in the claims.

In the drawings, A represents the binding-table or apron, upon which the cut grain is delivered from the grain-platform of the harvester by means of an elevator or other equivalent arrangement to be bound into gavels or bundles.

B is a metal frame or standard, having a lower horizontal arm, B', extending underneath the binding-table, and an upper horizontal arm, B², which overhangs the binding-table, as shown in Figs. 1 and 3. This frame is preferably made hollow for lightness, and its lower arm accommodates a shaft, C, and its upper arm a similar shaft, C', as shown in dotted lines, Fig. 3.

To the inner end of shaft C is secured a gear-wheel, D, and to the outer end thereof a sprocket-wheel, D', is secured. The upper shaft, C', is also provided with a sprocket-wheel, C², clamped to a friction-disk, W, by a nut, W², and is driven from shaft C by means of an endless chain, E, running over said sprocket-wheels D' and C². The endless chain is kept under proper tension by a wheel, $y$, mounted in an adjustable arm, Z. A crank, F, is fixed to the inner end of shaft C', and its wrist $f$ consitutes the support and fulcrum of the binding-arm G.

Projecting laterally from and secured to the arm B² is a slotted metal guide, H, in the slot $h$ of which works a roller, $g$, mounted upon a stud on the inner end of the binding-arm, as shown in Figs. 2 and 3. As the binding-arm is carried around by the rotation of the crank F, the roller $g$ plays back and forth in the slot $h$, and guides and controls the movement of the binding-arm, so that its outer end or point, which carries the wire, shall properly enter the stream of grain being delivered upon the binding-table, separate the same into bundles, and pass the wire band around the bundles into position to be operated upon by the twisting mechanism.

The mechanism for twisting the wire and cutting off the same preparatory to the discharge of the bound gavels or bundles from the machine is located beneath the binding-table, and consists of the following parts, viz: a pivoted or vibratory arm or lever, I, operated by a cam on the side of gear-wheel D, a rotary twisting-head, J, and a rotary cutter, K, mounted upon the said vibratory arm I, a stationary segmental rack-bar, L, for rotating the twisting-head and the cutting-head, and a sliding rack-segment, M, for arresting the rotation of the twisting-head while the cutting-head still continues to rotate, all constructed and operating in manner following, viz: The vibratory arm or lever I is provided at its lower end with a laterally-projecting stud or journal, $i$, which enters a recess or socket in an offset, $B^3$, of the part B', and forms the pivot upon which said arm I vibrates, and it is provided at its upper end with two laterally-projecting flanges, $i^2$ $i^3$, which embrace the segmental rack-bar L, as shown in Figs. 3, 4, and 22, and serve as bearings for the shafts of the twisting and cutting heads. Said arm I is further provided on its side with a stud-carrying friction-roller, $i'$, which is adapted to engage with cam-surfaces $d$ $d'$ on the wheel D. When the gear-wheel D is rotated in the direction indicated by the arrow, Fig. 4, the cam-surfaces $d$ $d'$ alternately come in contact with the roller $i'$ and cause the arm or lever I to be vibrated back and forth under the binding-table parallel with the slot $a$ therein, being guided in its movements by the stationary segmental rack-bar L. The segmental rack-bar is supported at its ends by brackets L' L', as shown in Fig. 4, and its outer face is provided with cog-teeth extending nearly its entire length, the teeth from $l$ to $l'$ being the longest, those from $l'$ to $l^2$ somewhat shorter, and those from $l^2$ to $l^3$ still shorter. A deep groove or recess is made in the back side of the bar L for the accommodation of a sliding bar, N, (shown in Figs. 4, 5, and 6,) and the top is cut away at $i^4$ to receive the sliding segmental rack M, which is attached to the bar N, while the bottom is cut away at $l^5$ $l^5$ to admit spring-pawls $l^6$ $l^7$. The teeth of the sliding segmental rack M are of the same width and distance apart as the teeth of the rack-bar L, and are of a length equal to the difference between the length of the teeth extending from $l$ to $l'$ and those extending from $l'$ to $l^2$. Consequently when said segmental rack M is slid along the bar L until its teeth register with the teeth from $l'$ to $l^2$, a continuous rack composed of teeth of uniform length will be formed, extending from $l$ to $l^2$. A back-and-forth movement is given to the sliding segmental rack M by means of the vibratory arm or lever I and lugs or projections $n$ $n$ on the back of the sliding bar N at each end thereof, with which the arm I comes alternately in contact in its vibratory movements.

The spring-pawls $l^6$ $l^7$ are adapted to be alternately engaged with and disengaged from the opposite ends of the sliding bar N, in order that said bar and its connected segmental rack may not be disturbed or displaced except when positively moved by the vibratory arm I coming in contact with one or the other of the lugs or projections $n$ $n$. The arrangement of the pawls $l^6$ $l^7$ is such that before the arm I strikes one of the lugs $n$ the spring-pawl near the lug about to be struck is disengaged from the bar N, and allows the said bar to be carried to the limit of its movement in that direction. As it reaches said limit, the other pawl, which before was disengaged, then becomes automatically engaged with the opposite end of the bar N and remains so engaged until the vibratory arm I traverses back and disengages it in the same manner as it did the first-mentioned pawl. The head of each pawl is made wide and tapering, and is provided with a retaining-shoulder, $l^8$, which engages with a corresponding shoulder, $n^2$, on the end of the bar N. The wide head of the pawl projects laterally beyond the inner side face of the bar N, and when the vibrating arm I moves up said pawl enters a gain or slot, $i^5$, in said arm, and is thereby depressed and disengaged from the shoulder on the bar N, thus allowing the arm I to strike the lug $n$ and carry the bar N forward. A spring, $l^9$, is coiled about the shank or pivot $l^{10}$ of each of the pawls to keep the latter at all times pressed up against the under side of the bar, N, in position for instant engagement with the shoulders $n^2$ $n^2$ on the latter.

Having thus described in detail the construction of the stationary segmental rack-bar L of the sliding segmental rack M, and of the mechanism for moving and locking said rack M, I will next proceed to describe the construction and operation of the twisting-head J and rotary cutting-head K, by means of which, in connection with vibratory arm and rack-gear, before mentioned, the wire band is held, twisted, and cut off, preparatory to the ejection of the bound gavels from the machine.

The laterally-projecting flanges $i^2$ $i^3$ of the vibratory arm or lever I extend out beyond the toothed face of rack-bar L, and form bearings for a short solid shaft, P, and a hollow shaft, P'. The shaft P has a pinion, $p$, near its lower end, the teeth of which are of the same length as or a trifle longer than the teeth on stationary segmental rack-bar L between the points $l^2$ $l^3$, so that when the arm I is vibrated from one end of the rack-bar to the other the pinion $p$ and shaft P will be rotated during its entire movement.

To the lower end of the hollow shaft P' is secured another pinion, $p'$, the teeth of which are slightly longer than the teeth of pinion $p$. This pinion $p'$ is adapted to engage with the upper part of the teeth of the stationary segmental rack-bar L from the point $l$ to the point $l^2$, and also with the teeth of the sliding rack-segment M, but not with the teeth on the stationary rack-bar between the points $l^2$ and $l^3$. When the vibrating arm I moves toward the upper end of the stationary rack-bar L, it releases the spring-pawl $l^6$, and, striking the projecting-lug $n$ on the upper end of the bar N, causes said bar to move forward and carry the sliding segmental-rack M to the limit of its movement, in which position the end $m$ of said rack M abuts against a shoulder, $l''$, on bar L, leaving an unbroken smooth top surface from the upper end of bar L to the lower end of segmental rack M. In this position, also, the teeth of the sliding rack M are in line with the teeth on the stationary rack-bar L embraced between the points $l'$ $l^2$, and form a continuation thereof. When the vibratory arm or lever I moves back to the lower end of bar L, both pinions $p$ $p'$ are simultaneously rotated at the same speed till the end of the toothed section $l'$ $l^2$ is reached, at which point arm I disengages the lower pawl, $l^7$, from the sliding bar N, strikes the lower lug, $n$, on said sliding bar, and carries the sliding rack M along with it, thereby arresting the rotation of the pinion $p'$, while the pinion $p$ still continues to rotate by reason of its engagement with the short rack-teeth between $l^2$ and $l^3$.

The hollow shaft P' carries at its upper end the twisting-head J, and the solid shaft P carries the cutting-head K. The parts are so arranged that when both shafts are rotated together the twister is in operation and the cutter out of operation; but when the shaft P' is stopped and the rotation of shaft P still continued the twister ceases to operate and the cutter comes into active operation to sever the wire.

In order that the manner of twisting, holding, and cutting the wire may be clearly understood, I will now give a particular description of the construction of the twister and cutter and the manner in which they operate, both independently and together.

The twisting-head J is shown in Figs. 11 and 12, the former figure representing a side elevation of it and the latter figure a top plan view. It consists of a central portion or enlargement, made flat on top and cut away on opposite sides so as to form two curved hooks, $jj$, and rounded or curved inward on its under side to form a shank, $j^2$. Above the central portion or enlargement is a circular flange, $j^3$, cut away or slotted at $j^4 j^4$, and between said upper flange and central enlargement is a contracted circular bearing, $j^5$, also cut away or slotted at $j^6 j^6$ in line with the slots $j^4 j^4$ in the upper flange, and the openings $j^7 j^7$ behind the points of the hooks $jj$. Each hook $j$ tapers inward from its point to its base $j^8$, and its base forms one of the walls of the opening $j^7$ near the point of the other hook. The opposite upper and lower corners, $j^9 j^9$, of the slots $j^4 j^4$ in the circular flange $j^3$ are rounded or beveled off, as shown clearly in Fig. 11, leaving a sharp cutting-edge at the corner $j^{10}$ for co-operating with the rotary cutting-head to cut the wire, as will be presently explained.

The cutting-head K is shown in side elevation attached to its shaft in Fig. 10 and detached therefrom in Fig. 15, and in top plan in Fig. 17. It consists of a circular hook, $k$, having an inwardly-projecting top flange, $k'$, by means of which it is attached to its shaft P, and a wide bottom flange, $k^2$, also projecting inwardly and extending part way around, as shown in Fig. 15. The lower face or edge of the hook $k$ is flat from point to base, while its upper edge from the point to the flange $k'$ is rounded and tapered, as shown in Figs. 9, 10, 15, and 17, and then continues flat or straight to its base. Where the upper edge of the hook meets the flange $k'$ sharp cutting edges or corners are formed, the lower one, $k^3$, of which co-operates with the cutting-edge $j^{10}$ of the upper circular flange of the twisting-head to sever the wire, as will be hereinafter explained. When the cutting-head is placed in its proper relation to the twisting-head its lower flange, $k^2$, projects inward between the hooks $jj$ and the flange $j^3$, and in close proximity to the contracted bearing $j^5$, while its upper flange, $k'$, extends over the top of flange $j^3$, and the bottom of its curved hook $k$ lies in close proximity to the flat upper surface of the twisting-hooks. The cutting-head being secured to the shaft P and the twisting-head being secured to the hollow shaft P', the cutting-head can be made to rotate while the twisting-head is held still, and vice versa, without undue friction or binding of the parts. Secured to the top of the vibratory lever I is a laterally-projecting metal arm, R', which extends out over the twisting and cutting devices, is bent laterally at right angles and back on itself so as to form a loop, $r$, and then bent downward and around in front of the twisting-head, all as shown in Figs. 9 and 13. A prong or spur, $r'$, is secured to the upper part of the said arm for a purpose to be presently explained.

The wire with which the binding is to be effected is carried from a spool, S, over a friction-pulley, $s$, mounted in a short arm, $t$, of a spring take-up, T, thence over another friction-pulley, $s'$, in the outer end of the long arm $t'$ of the take-up, and thence again over the back of the binding-arm and through an eye, $g'$, near the point of the latter.

The operation of the mechanism in binding the grain into gavels or bundles is as follows: Motion being communicated to the large gear-wheel D by means of a pinion, $d^*$, mounted on a shaft driven from the harvester proper, such motion is transmitted through the shaft C, sprocket-wheels $C^2$ D', and endless chain E, to the shaft C', and the binding-arm G, carrying the wire, is caused to descend in a curved path by means of the crank F and the slotted guide H. While the binding-arm is thus descending, the vibratory arm I beneath the binding-table, carrying the twisting and cutting devices, remains stationary at the upper end of the fixed rock-segment L. As the point of the binding-arm passes down through the slot of the binding-table, the portion of the wire which projects through the eye $g'$ strikes the curved lower part, $r^2$, of the arm R', and is directed into the space $j^7$ behind the point of one of the hooks $j$ of the twisting-head, and also into the slot $j^3$ of the upper flange of the twisting-head, and in front of the hook of the rotating cutter K, the end of said projecting portion of the wire extending up over the loop $r$ of the arm R′ and out of the slot in the binding-table. This of course is all accomplished in an instant, and immediately the arm I begins to move down the stationary segmental rack-bar L, and with it the binding-arm, the twisting and cutting heads, being meanwhile rotated together by the pinions on their respective shafts engaging with the teeth on the side of the rack-bar. As this simultaneous rotation of the twisting and cutting heads takes place that portion of the wire which is below the hook of the twister is wound several times around the shaft $j^2$. When both pinions have traveled down the stationary rack-bar to the point $l^2$, the arm I then strikes the lower projecting lug, $n$, of bar N, and the rack-segment M is caused to slide down with the said arm I, thereby arresting the rotation of the pinion $p'$ and the twisting-head, while the cutting-head continues to rotate by reason of the pinion $p'$ on its shaft being still engaged with the short teeth on the rack-bar between the points $l^2$ and $l^3$. This continued rotation of the cutting-head causes the hook of the cutter to press the wire closely into the recess or slot $j^4$ in the flange of the twister-head and the wire to be cut off by the co-operation of the cutting-edge $k^3$ on the cutting-head and the cutting-edge $j^{10}$ on the flange of the twister-head. After the cutting off of the wire the cutting-head continues to rotate until the point of its hook $k$ lies just behind the point of the twister-hook, which is opposite the hook just engaged with the wire. The extreme end of the wire is now held in the slot $j^3$, in the flange of the twister-head and in the slot $j^6$ in the bearing $j^5$ of the twister-head by the inner side of the hook of the cutting-head and the lower flange $k^2$. As before stated, several turns of wire remain wound around the shank $j^2$ of the twister-head. The grain is supposed to be being delivered onto the binder-table, while the binding-arm is again rising, and the arm I, carrying the twister, &c., is stationary, and remains so till the binding-arm begins to again descend to separate a gavel or bundle from the stream of grain, at which time the arm I begins to again move up toward the upper end of the stationary segmental rack L, the wire between the twisting-head and the point of the binding-arm operating the while to press and force back the grain toward the upper side of the binding-table. During the upward movement of the arm I the gears $p\ p'$ are of course rotated in an opposite direction, and the several turns of wire around the shank of the twisting-head are gradually unwound, so that by the time the arm I reaches the upward limit of its movement only the extreme end of the wire remains secured behind the flange of the cutting-head, as before described. The slack of the wire occasioned by the unwinding of the wire from the shank of the twister-head is immediately taken up by the spring take-up. When the binding-arm makes its second descent through the slot in the binding-table, the wire is caught by the part $r^2$ of the arm R′, as before, and directed into the space $j^7$ behind the point of the hook $j$ of the twisting-head, and into slots $j^4\ j^6$, in the same manner as before, said hook, space, and slots, however, being opposite those in which the wire was directed at the first-described operation. The wire being now held on opposite sides of the twisting-head, as the arm I moves down the stationary rack-bar the second time the twister makes several revolutions and twists the parts of the wire several times together. Upon the stoppage of the twisting-head the cutting-head continues to rotate, as before described, and cuts the part of the wire last secured, and at the same time it releases the end of the wire first secured, thus leaving the bound gavel entirely free and ready to be delivered from the machine.

The projecting spur or prong $r$ of the arm R′ serves to push the gavel down the binding-table while it is being bound, and also to assist in throwing the gavel from the machine after it is bound and the wire cut.

It is desirable that the binding-wire be put under greater tension when it is nearly around the bundle, and just before it enters the twister a second time, in order that it may act to tightly compress the bundle before it is tied. The mechanism by which I have accomplished this object in the present machine is as follows:

S is a spool for carrying the binding-wire, provided with a projecting hollow bearing at its lower end, which is adapted to fit upon a pin or stud projecting upward from a boss, $b$, on the upper side of the arm B$^2$ of the frame, so as to allow the spool to revolve thereon. The lower circular head, $u'$, of the spool is made wide, so as to form a friction-face for the application of a friction or brake shoe, V, and is provided with flanges $u^2\ u^3$ to prevent the said shoe from slipping off said face. The friction-shoe is connected to a yoke, $v^2$, which has a shank, $v^3$, screw-threaded at its end, that passes through the upper arm of a bell-crank lever, V$^4$, and is provided with an expanding spiral spring, $v^5$, and an adjusting-nut, $v^6$. The bell-crank lever V$^4$ is pivoted at $v^7$ to a lug on the top of the metal frame, and its lower horizontal arm, $v^8$, carries at its end a friction roller, $v^9$, which is adapted to engage with a rotating cam, $w$, secured to a disk, W, fixed to the shaft C′. A moderate friction is at all times exerted on the spool S by the spring $v^5$ sufficient to prevent the wire from unwinding too readily; but when the wire has been nearly passed around the bundle by the binding-arm, and just before it engages with the twisting devices, the cam $w$ strikes the roller $v^9$ and, vibrating the bell-crank lever, causes the spring $v^5$ to be compressed and the friction or brake shoe V to be more tightly borne against the friction-face of the spool, thus giving greater tension to the wire to enable it to gather up and compress the grain into a compact bundle.

For the purpose of regulating the extent of the vibration of the bell-crank lever when struck by the rotary cam, and consequently the amount of increased tension produced on the wire, an adjusting-screw, $v^{10}$, is inserted through a screw-threaded hole in the lower horizontal arm, $v^8$, of the bell-crank, with its point bearing against the top $B^2$. By turning this screw to the right the outer end of the arm $v^8$ will be elevated, so that when the cam strikes the roller the vibration of the bell-crank will be shortened, while by turning said screw to the left the opposite result will be effected. The normal pressure of the friction-shoe can be regulated by the adjusting-nut $v^6$.

The cam $w$ is preferably adjustably connected to the disk W, so that its position may be changed thereon for the purpose of regulating the point at which it shall operate the bell-crank lever to apply the increased tension. To this end a curved slot, $w'$, is made in the side of the disk W and a bolt, $w^2$, passed out through said slot and also through the cam, a clamping-nut, $w^3$, being applied to the end of said bolt. The inner face of the cam, as well as the face of the disk alongside of the slot, is provided with teeth or serrations $w^4$ for the purpose of holding the cam firmly in any position to which it is adjusted.

The binder thus constructed is adapted to be applied to any of the approved styles of harvesters.

I claim as my invention—

1. The combination of the vibratory lever, the twisting and cutting heads, and their respective shafts and pinions with the stationary segmental rack and the sliding-rack segment, all arranged and adapted to operate substantially as described.

2. The combination of the vibratory arm or lever, the sliding bar N, carrying the sliding-gear segment and having lugs $n$ $n$ at its ends, and the spring-pawls $l^6$ $l^7$, substantially as described.

3. The arm R', provided with the spur or prong $r'$, for pushing the bundle along over the binding-table, substantially as described.

4. The twisting-head J, having the hooks $j$ $j$, which project outward so as to grasp the wire with certainty, and having the shank $j^2$ and circular slotted flange $j^3$, in combination with the clamping and cutting head K, having the hook $k$, upper flange, $k'$, and lower flange, $k^2$, substantially as described.

5. The combination, with the wire-spool, of the friction-shoe, its yoke, shank, spring, and adjusting-nut with the bell-crank lever and the rotating cam $w$, substantially as described, for the purpose specified.

6. The combination, with the wire-spool, of the friction-shoe, its yoke, shank, and spring with the bell-crank, the adjusting-screw $v^{10}$, and the adjustable rotating cam $w$, substantially as described.

7. In combination with the band-fastening and retaining device, constructed and operating substantially as described, the two pinions thereon, the two racks and automatic devices, substantially such as shown, to give one of said racks an end motion with relation to the other.

LEWIS MILLER.

Witnesses:
N. N. LEOHNER,
RALPH P. BURNETT.